Patented Oct. 21, 1941

2,260,035

UNITED STATES PATENT OFFICE 2,260,035

REFRACTORY INSULATING MATERIAL AND METHOD OF MAKING SAME

Louis Krieger, Paris, France, assignor to General Electric Company, a corporation of New York No Drawing. Application October 6, 1939, Serial No. 298,339. In France October 19, 1938

5 Claims. (Cl. 106—46)

This invention relates to electric heating elements and in particular to an improved refractory insulating material for such heaters and to a process for preparing the same.

Refractory products that are electrical insulators are used as covering or coatings for resistance conductors for the purpose of transmitting the thermal energy produced by these resistances to those materials whose temperature is to be raised, while maintaining a good electrical insulation between the resistance and said materials. These refractory insulating materials on the one hand must retain their insulating properties at high temperatures, and on the other hand must have a high physical compactness so that the heating system is mechanically stable and has a heat transmission which is as high as possible. Similar qualities are required for the insulation of the conductors in certain electrical conduit systems.

Among the substances which have met these requirements, anhydrous magnesium oxide, MgO, has been used considerably but its application around the resistance conductor within a metallic sheath or other enclosure to hold the conductor in spaced relation with the enclosure has ordinarily entailed certain manufacturing difficulties.

The present invention relates to new refractory electrically insulating products which are easier to prepare and use than are the magnesia or other refractory insulating materials previously used. The products of this invention are essentially characterized by the fact that they comprise, as a principal ingredient, a hydrated refractory material that forms the electrical insulator or a mixture of such hydrated materials. These refractory materials are pulverized and mixed with one or more finely divided reducing metals. When these mixtures of the hydrated refractory materials and the pulverized reducing metals are heated after being properly introduced in the usual manner into those places where they are to be utilized, a decomposition of the water contained in the refractory materials takes place with a resultant swelling and hardening of the mixture in situ.

In order to more fully describe the invention, the following example is given, covering the preparation of a heater comprising an enclosed or sheathed resistance conductor. It is to be understood, however, that the invention is not limited to the particular applications described in the example but may be applied wherever a refractory insulation of this type is desired, for instance, as a coating for simple conductors or other conducting parts or members.

As a basic or principal material, natural steatite, that is, natural hydrated magnesium silicate whose normal composition is $4SiO_2 3MgOH_2O$, has been found to possess certain advantages. This substance is found in nature in a state of sufficient purity for the purposes of this invention and, as the natural steatite is only moderately hard, it can be easily crushed or pulverized. However, in its natural state this material cannot be used as a refractory insulation for above 600° C. it quickly loses the water it contains and contracts considerably.

In conformity with this invention, the natural steatite is transformed in situ into a neutral magnesium silicate, possibly enstatite, having the formula $SiO_2MgO$, by decomposing the water in the steatite at a temperature varying between about 1000° C. and 1100° C. by means of the pulverized magnesium intimately mixed with the steatite. The reaction may take place according to the following formula:

$$4SiO_2 3MgOH_2O + Mg = 4(SiO_2MgO) + H_2$$

After the pulverized magnesium and the finely divided steatite have been properly mixed, the mixture is introduced into the space between the enclosure containing the resistance element and the element per se and is firmly pressed or packed into place by any appropriate means, such as by vibration or the like, in order to obtain a very good distribution of the mixture and a sufficient packing of the powder to insulate the resistance element both mechanically and electrically from its surroundings. The sheath or enclosure into which the magnesium-steatite mixture is introduced may be in the form of a tube, such as a metal tube, or in the form of a hollow metal plate, such as the plates found in heaters commonly used on electric kitchen ranges. The enclosure or casing either in the form of a metal tube or hollow plate and containing the resistance wire or wires and the refractory mixture then is closed but not hermetically sealed and is heated by any appropriate means, as by external heating, to the reaction temperature of 1000° C. to 1100° C. During the reaction, the formula for which has already been given, hydrogen is liberated and the mixture swells and hardens within the space in which it has been packed. After the reaction is complete, the enclosure for the heating element is sealed, equipped with the usual accessories, and then is ready to be placed in service.

In order to avoid any possible reaction of the pulverized magnesium on the silica of the steatite, a small quantity of an alkali or alkaline-earth nitrate, such as potassium or magnesium nitrate, can be introduced into the steatite-magnesium mixture. Inasmuch as some of the alkali is also admixed with the enstatite resulting from the reaction if an alkali nitrate is used, it is necessary that the proportion of the alkali nitrate should not exceed two per cent in order not to reduce the insulation resistance of the material at high temperatures. The nitrate may be added to the pulverized mixture as a dry powder or to the steatite in a state of solution. If added to the steatite in the form of solution, the steatite should preferably be dried prior to its mixture with the magnesium powder.

One composition which has proven suitable for the purposes of this invention is as follows:

|  | Parts by weight |
|---|---|
| Steatite | 92.4 |
| Magnesium | 5.6 |
| Potassium nitrate | 2.0 |

These proportions may vary within certain limits depending upon the condition of the steatite and depending upon the desired results. The amount of reducing metal present preferably should approximate but not exceed that quantity which will react completely with the water chemically combined or otherwise associated with the principal ingredient.

In place of steatite, other materials, such as hydrated silica, hydrated alumina, or the hydrated silicates of alumina or of alkaline-earth oxides, may be used. Instead of magnesium, other suitable reducing metals, such as aluminum, cerium or calcium, are useful. In order to avoid the reduction of the silica obtained in the steatite, metal peroxides, such as the peroxides of magnesium or barium, may be added to the mixture of the hydrated refractory body and the reducing metal.

What I claim as new and desire to secure by Letters Patent of the United States is:

1. A refractory insulating material comprising the heat-reaction product of a mixture of approximately 92.4 parts steatite, not more than 5.6 parts magnesium, and 2 parts alkali nitrate.

2. A refractory insulating material comprising the heat-reaction product of a mixture of natural steatite and magnesium, said magnesium being present in an amount approximating but not exceeding substantially the amount calculated as necessary to react completely with the water present in the steatite.

3. The method of producing a refractory insulating material which comprises intimately mixing finely divided natural hydrated steatite with a quantity of finely divided magnesium approximating but not exceeding substantially that amount calculated as necessary to react with the water contained in the hydrated steatite, and heating said mixture to a temperature of 1000° C. to 1100° C.

4. The method of producing a refractory insulating material which comprises intimately mixing finely divided natural hydrated steatite with a quantity of finely divided magnesium approximating but not exceeding substantially that amount calculated to react with the water contained in the hydrated steatite, and a small amount of potassium nitrate, and heating said mixture to the decomposition temperature of the water contained in the hydrated steatite.

5. The process of preparing an electric insulating product from a hydrated natural steatite which comprises pulverizing the natural steatite, mixing the pulverized natural steatite with a quantity of powdered magnesium approximating but not exceeding substantially the amount calculated as necessary to decompose the water contained in the hydrated steatite at elevated temperatures, and heating the mixture to the decomposition temperature of said water of hydration.

LOUIS KRIEGER.